(12) United States Patent
Ross et al.

(10) Patent No.: US 8,050,166 B1
(45) Date of Patent: Nov. 1, 2011

(54) SYSTEM AND METHOD FOR IMPROVED DATA STORAGE

(75) Inventors: John Anderson Fergus Ross, Niskayuna, NY (US); Victor Petrovich Ostroverkhov, Ballston Lake, NY (US); John Erik Hershey, Ballston Lake, NY (US); Brian Lee Lawrence, Waunakee, WI (US); Kenneth Brakeley Welles, II, Scotia, NY (US); Milos Todorovic, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/775,590

(22) Filed: May 7, 2010

(51) Int. Cl.
*G11B 7/00* (2006.01)
(52) U.S. Cl. .......................................................... 369/103
(58) Field of Classification Search .................. 369/103
See application file for complete search history.

(56) References Cited

U.S. PATENT DOCUMENTS

| 7,085,209 B2 | 8/2006 | Schep et al. |
| 2004/0120247 A1 | 6/2004 | Lee et al. |
| 2006/0203706 A1 | 9/2006 | Xu et al. |
| 2007/0008840 A1 | 1/2007 | Martens et al. |
| 2007/0098949 A1* | 5/2007 | Ando et al. ................. 428/64.4 |
| 2010/0061214 A1* | 3/2010 | Orlic et al. ................... 369/103 |
| 2010/0157757 A1* | 6/2010 | Ross et al. ................. 369/47.17 |

OTHER PUBLICATIONS

Kuohua Wu, Dennis Howe & Song-Yeu Tsai; "Recording of Multi-Level Run-Length-Limited (ML-RLL) Modulation Signals on Phase-Change Optical Discs"; Conference Paper—Optical Data Storage (ODS),May 11, 2003, Poster Session (TuE); pp. 252-254.

Christophe Dorrer; "Monitoring of Optical Signals From Constellation Diagrams Measured With Linear Optical Sampling"; Journal of Lightwave Technology, vol. 24, No. 1, Jan. 2006; pp. 313-321.

Hua Hu, Longfa Pan; "PRML Detection of Multi-Level DVD Channels with Run-Length-Limited Modulation"; Communications, 2007. ICC '07; IEEE International Conference, Jun. 2007; pp. 6238-6242.

* cited by examiner

*Primary Examiner* — Adam R Giesy
(74) *Attorney, Agent, or Firm* — Joseph J. Christian

(57) ABSTRACT

A method for storing data on a storage medium is provided. The method includes receiving a modulated bitstream, wherein the modulated bitstream comprises a plurality of bits comprising a bitstate of 1 and 0. The method also includes secondary modulating each of the plurality of bits comprising the bitstate of 1 to output a plurality of secondary modulated bits. The method further includes forming a plurality of marks in the storage medium, the marks indicative of each of the plurality of secondary modulated bits and the plurality of bits comprising the bitstate of 0 in the modulated bitstream.

21 Claims, 5 Drawing Sheets

SYSTEM AND METHOD FOR IMPROVED DATA STORAGE

BACKGROUND

The present techniques relate generally to bit-wise holographic data storage techniques. More specifically, the techniques relate to methods and systems for modulating bit streams for storage on optical disks.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the one to a few layers of data storage that may be used in DVD and Blu-ray Disk™ formats, holographic disks may have 50 or 100 layers of data storage, providing data storage capacities that may be measured in terabytes (TB).

With rapid advances in technology, multimedia with enhanced features are being produced that require high storage capacity and upgraded technology drives to reproduce the content. Consequently, this results in increased manufacturing costs. Furthermore, there is an increasing demand in storage industry in terms of storage capacity and data transfer rate. Accordingly, there is a need for an improved storage system that may address one or more of the aforementioned issues.

BRIEF DESCRIPTION

In accordance with an embodiment of the invention, a method for storing data on a storage medium is provided. The method includes receiving a modulated bitstream, wherein the modulated bitstream comprises multiple bits comprising a bitstate of 1 and 0. The method also includes secondary modulating each of the multiple bits comprising the bitstate of 1 to output multiple secondary modulated bits. The method further includes forming multiple marks in the storage medium, the marks indicative of each of the multiple secondary modulated bits and the plurality of bits comprising the bitstate of 0 in the modulated bitstream.

In accordance with another embodiment of the invention, an optical storage disk is provided. The optical storage disk includes at least one recording layer, wherein the recording layer comprises a photosensitive media comprising multiple micro-holograms, wherein each of the micro-holograms are indicative of multiple secondary modulated bits.

In accordance with another embodiment of the invention, an optical recording system for a storage medium is provided. The optical recording system includes a processor configured to modulate a channel of bits to output a modulated bitstream, wherein the modulated bitstream comprises multiple bits including a bitstate of 1 and 0. The processor is also configured to secondary modulate each of the multiple bits comprising the bitstate of 1 to output multiple secondary modulated bits. The optical recording system also includes an optical drive electronics unit electrically coupled to the processor, wherein the optical drive electronics unit is configured to receive one or more command signals from the processor. The optical drive electronics unit is also configured to actuate one or more optical components to form multiple marks on the storage medium indicative of the multiple secondary modulated bits.

In accordance with yet another embodiment of the invention, an optical reader for a storage medium is provided. The optical reader includes an optical drive electronics unit configured to detect a reflected light beam from the storage medium, wherein the storage medium includes multiple bits in a modulated bitstream including a bitstate of 0 and multiple secondary modulated bits. The optical drive electronics unit is also configured to detect in the reflected light beam either one of multiple bits including the bitstate of 0 in the modulated bitstream or the multiple bits including the bitstate of 0 in the modulated bitstream and the plurality of secondary modulated bits.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
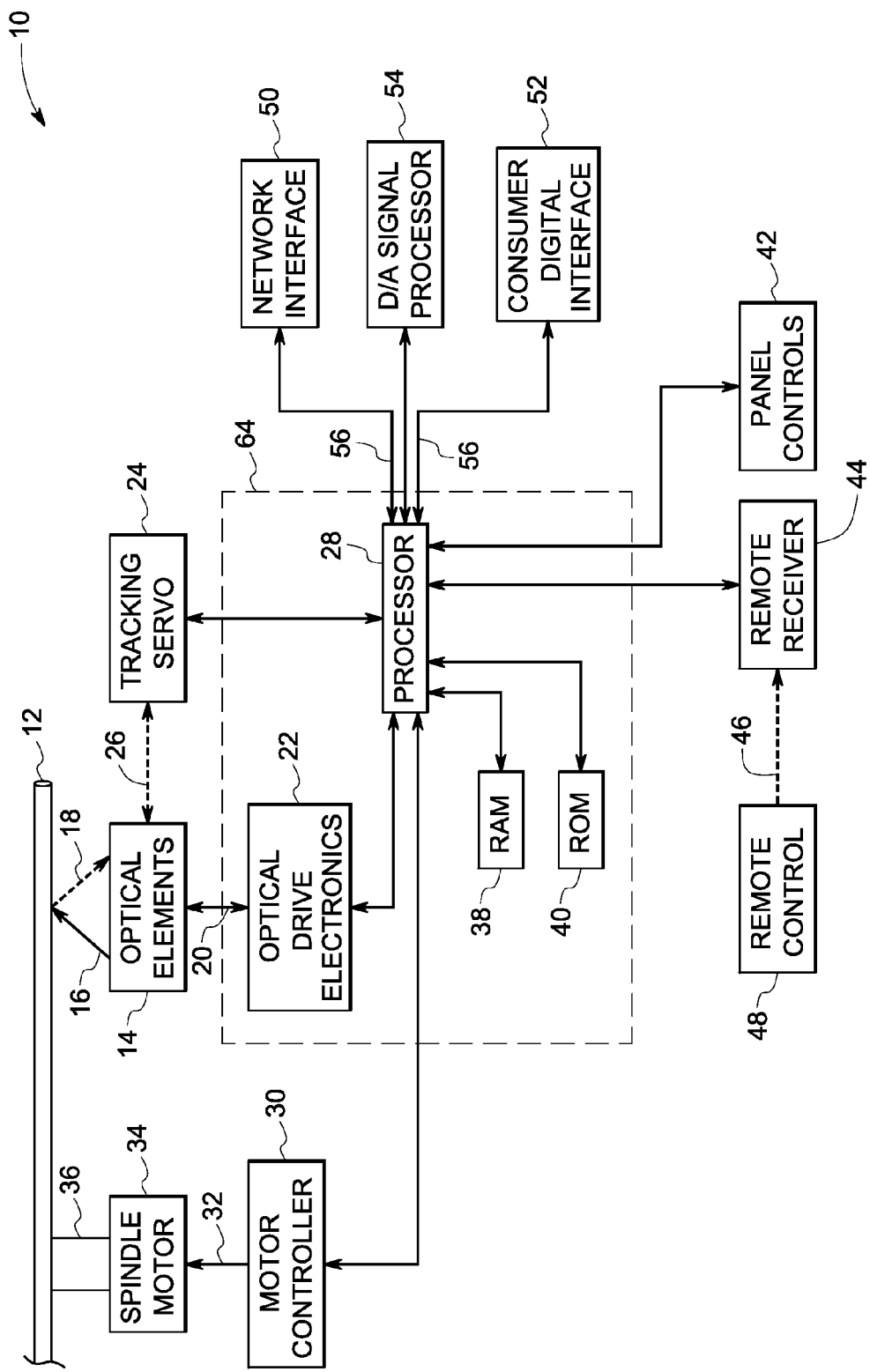
FIG. 1 is a block diagram of an optical disk drive in accordance with an embodiment of the invention.

As discussed in detail below, embodiments of the invention include a system and method for improved data storage. The system is configured to be backward compatible. The term 'backward compatibility' refers to the ability of system and method to allow for reading of data on a storage medium such as an optical disk by first generation drives as well as second generation drives. As used herein the term 'first generation drives' refers to drives that have read drive electronics to detect only the energy of a beam reflected from the disk. The term 'second generation drives' as used herein, refers to drives that have read drive electronics that detects phase and energy of the beam reflected from the disk.

One or more embodiments of the present technique will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Optical storage systems typically involve two separate encodings of the data bits to be stored. A first encoding is generally a forward error correcting code (FEC), such as the Reed-Solomon (RS) block-based error correcting code used in compact disks (CDs). An RS code may protect k data symbols, each containing s bits, with a codeword that is n symbols long, with each encoded symbol also comprising s bits. The RS code is capable of correctly decoding a codeword with up to t corrupted, but unidentified, symbols where 2t=n−k. RS coding may also deal efficiently with erasures, e.g., those symbols somehow known to be corrupted. If there are s errors and r erasures, the RS code may correctly decode the codeword so long as 2s+r<2t.

The second encoding generally used in optical storage systems may be termed "modulation coding." Modulation coding is the representation of the bits resulting from the first (e.g., RS) coding in a set of bit-sequences, or symbols, chosen to mitigate some undesirable effects that may be associated with the reading process. The symbols are then written to an optical data storage unit. For optical systems based on variations in height of a reflective surface, e.g., pits and lands, such as CDs, the symbols have generally been linear bit-sequences chosen to limit the number of sequential zeros or ones in a particular data track on an optical storage disk. Examples of such techniques include the eight-to-fourteen modulation (EFM), and the EFM+modulation and run-length limited (RLL) with NRZI modulation coding. Such techniques may also be referred herein to as 'primary modulation'.

The present technique introduces a secondary modulation in the event of a presence of a micro-reflector, such as, but not limited to, a micro-hologram in an output of the primary modulation. Furthermore, the RLL properties of the primary modulation are retained thus enabling backward compatibility. In one embodiment, the secondary modulation includes phase modulation of the writing beams that are employed to record micro-holograms. In another embodiment, the secondary modulation includes depth modulation of the micro-holograms. In yet another embodiment, the secondary modulation includes amplitude modulation of the micro-holograms.

Turning now to the figures, FIG. 1 is an exemplary optical recording/reader system 10 that may be used to write/read data from an optical storage disk 12. The data stored on the optical data disc 12 is written/read by a series of optical elements 14, which project at least one write/read beam 16 onto the optical data disk 12. It should be noted that although only one read/write beam 16 has been illustrated, typically the write process, as is well-known, includes two beams impinging on the disk 12. The writing is done by modulating the write beam according to an encoded bit stream that is being recorded, creating a varied reflectivity pattern corresponding to a modulation pattern in a recordable region of the disk 12. Upon readout, a reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics unit 22 may include such units as power supplies for one or more laser systems, detection electronics to detect an electronic signal from the detector, analog-to-digital converters to convert the detected signal into a digital signal and vice versa, and other units such as a bit predictor to predict when the detector signal is actually registering a bit value stored on the optical data disc 12.

The location of the optical elements 14 over the optical data disk 12 is controlled by a tracking servo 24 which has a mechanical actuator 26 configured to move the optical elements back and forth over the surface of the optical data disc 12. The optical drive electronics unit 22 and the tracking servo 24 are controlled by a processor 28. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disk may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, modulation/demodulation, coding/decoding or other functions necessary to convert the information from the optical data disc 12 into a data stream that may be used by other units.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

In case of the read system, after the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

In case of a write system, the data 56 to be recorded may be provided to the processor 28 through different units 50, 52, and/or 54. The data is stored in the RAM 38. The processor 28 sends an appropriate command to the optical drive electronics 22. Accordingly, the optical drive electronics 22 controls the optical elements 14 to write appropriate data on to the disk 12. The details of the algorithm referenced by numeral 64 employed by the processor 28 and the optical drive electronics 22 are described in FIG. 2.

Figure 2:
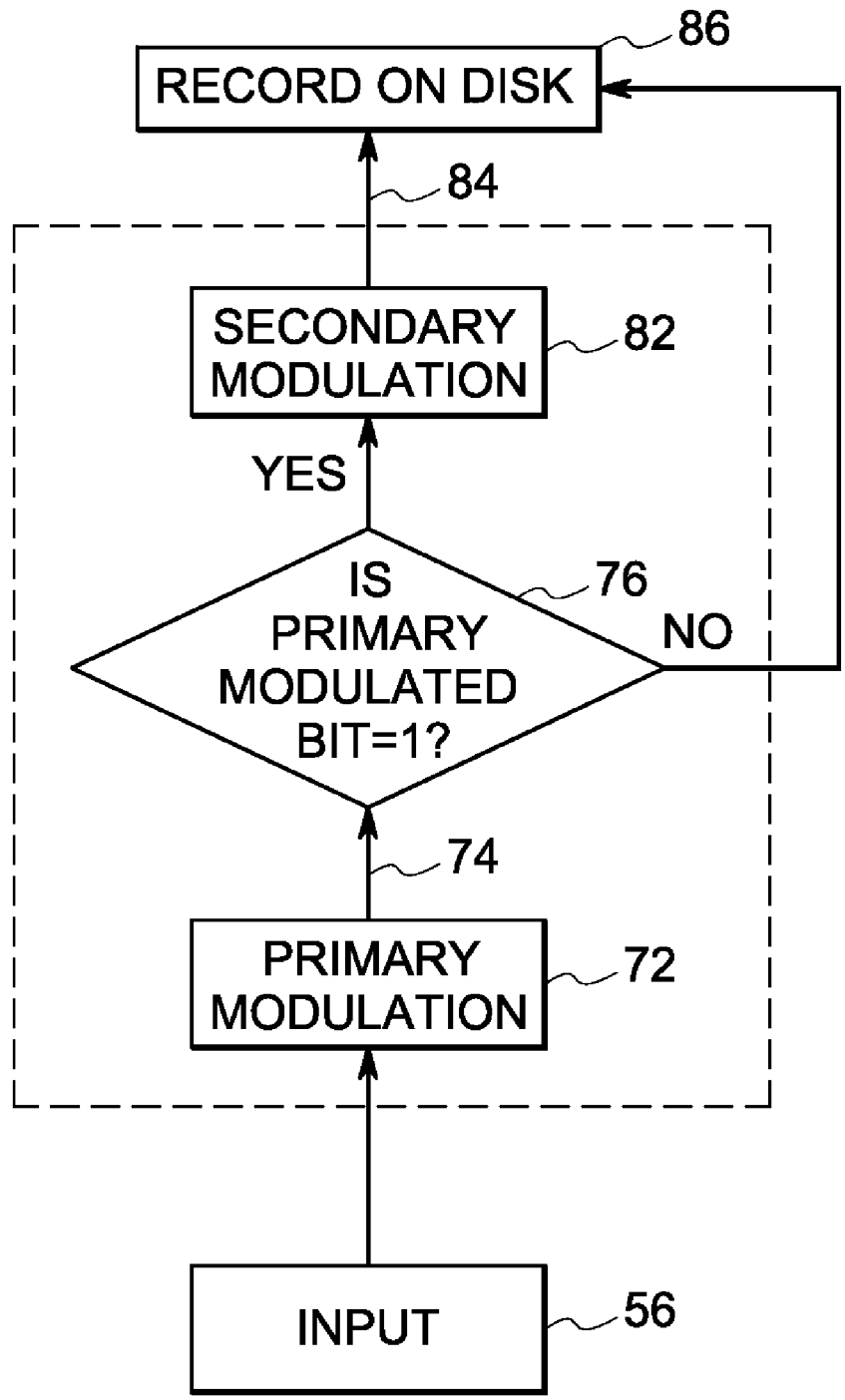
FIG. 2 is a block diagram representation of steps employed by the subsystem of optical disk drive electronics unit and the processor in FIG. 1 for recording on an optical disk.

FIG. 2 is a schematic representation of the steps employed in the subsystem 64 (FIG. 1). The processor 28 receives an input data stream 56 that undergoes primary modulation 72 to output primary modulated data 74. In a non-limiting example, the primary modulation includes RLL such as 17 pp with NRZI modulation. The processor 28 performs a decision step 76, wherein each of the bits in the primary modulated data 74 are compared to a '1', or otherwise known to be '1'. As used herein, the representation '1' signifies presence of a mark in the optical disk 12 (FIGS. 1), and '0' signifies absence of the mark. If the bit is '1', the bit undergoes a secondary modulation 82. As mentioned above, the secondary modulation includes phase modulation, depth modulation or amplitude modulation of the marks. In an exemplary embodiment, the marks include micro-holograms. The secondary modulated output 84 is further recorded on the disk 12 as referenced by 86. If the bit is '0', the primary modulated output bit is recorded as is on the disk 12, as referenced by numeral 86.

In an exemplary embodiment, consider a RLL input data stream 56 into the processor 28. The processor 28 primary modulates the input data stream 56 via NRZI modulation. The RLL NRZI modulation coded bitstream, also referred to as primary modulated bitstream, is checked for presence of '1' or in other words, a mark or a micro-hologram. In an event of '1', secondary modulation is performed. In an event of '0' occurring, secondary modulation is not performed. Accordingly, a secondary modulated bitstream is output that is recorded on the optical disk 12 (FIG. 1). Due to secondary modulation of only the '1' bits, the RLL properties are retained. This enables backward compatibility, wherein the optical disk is read by an optical drive system of an existing format. In a non-limiting example, a drive that does not have the ability to extract secondary data is able to play a holographic disk recorded with secondary modulated bits by decoding only the primary data. For better clarity, referring back to FIG. 1, the optical drive electronics unit 22 detects in the reflected light beam 18 either only the primary modulated bits, that includes the bits having bitstate of 0 in the modulated bitstream, or detects both the primary modulated bits as well as the secondary modulated '1' bits. In another example, the disk 12 includes a higher resolution movie and/or additional features stored in the secondary modulated bits, while the primary modulated bits include a lower resolution movie. Thus, an optical drive with upgraded technology, also, second generation drive, reproduces the higher resolution movie/special features, whereas an optical drive with existing technology also, a first generation drive, reproduces only the lower resolution movie.

In an example of micro-holograms on a holographic disk, fringes are formed by interference of two counter-propagating beams at allocation on the disk. Phase modulation is performed by shifting fringes of the micro-hologram. In one embodiment, such phase modulation is achieved by adjusting phases of the two beams via the optical drive electronics unit 22. In another embodiment, distance of lenses employed to focus the two beams, from the disk may be adjusted to alter depth of the fringes and thus, achieve phase modulation. In a particular embodiment, continuous phase modulation is employed. In another embodiment, discrete phase modulation is performed. By way of example, secondary modulation coding is according to a lattice code scheme or via forward error correction coding.

In another exemplary embodiment, amplitude modulation is performed that increases storage capacity of the storage medium 12 (FIG. 1). Parameters of light used to record micro-holograms may affect the magnitude of the refractive index modulation and/or size of the grating produced and consequently amount of diffracted light during readout. Hence, signal reflected from a '1' mark reaching the detector during readout varies according to the conditions used for writing. It should be noted that amplitude modulation does not affect depth position of the mark. In yet another embodiment, a combination of phase modulation and amplitude modulation may be employed. A non-limiting example includes two-dimensional modulation schemes such as M-PSK/N-PAM.

Figure 3:
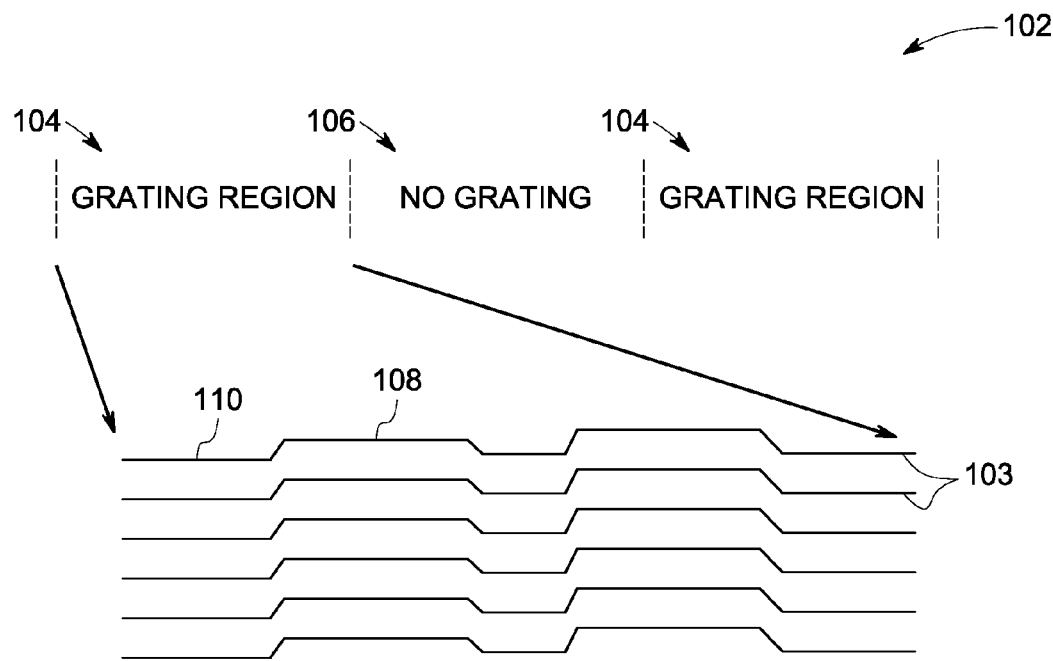
FIG. 3 is a schematic representation of an exemplary grating on a disk in accordance with an embodiment of the invention

FIG. 3 illustrates a grating 104 in the disk after phase or depth modulation. Each of the lines 103 represents a fringe in a holographic system. The output 102 includes alternating regions of 'grating' referenced by 104 and 'no grating' 106. The 'grating' region 104 indicates presence of a mark or a micro-hologram. As illustrated herein, the 'grating' region includes crests 108 and troughs 110, wherein the crests 108 indicate a secondary modulation.

Figure 4:
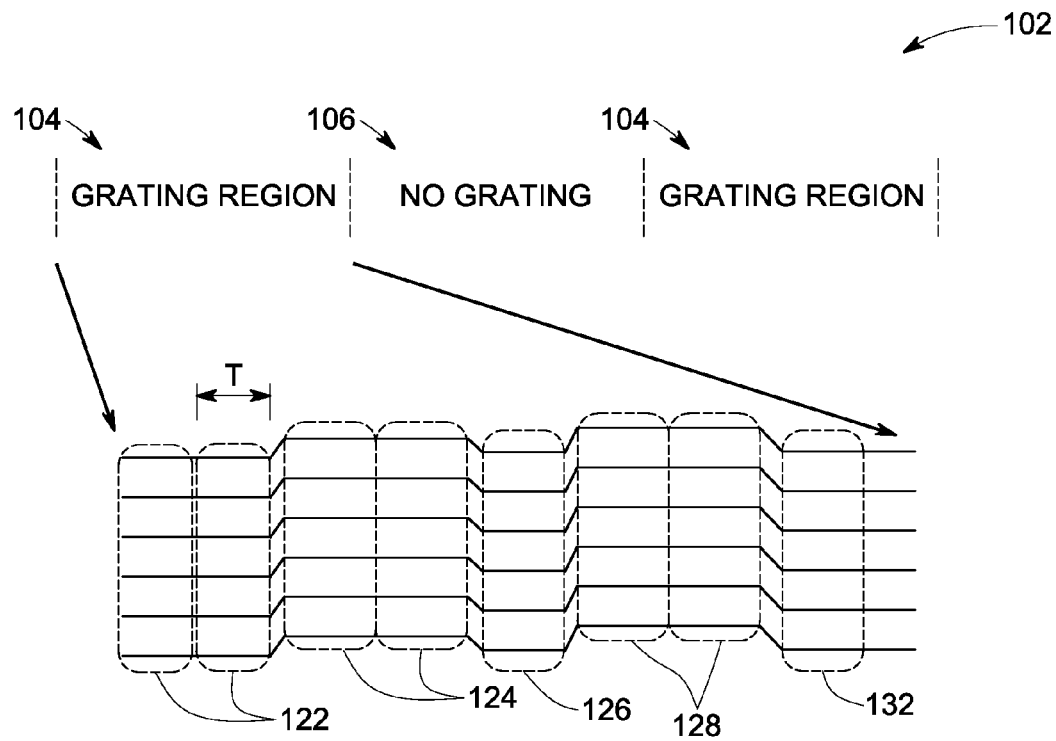
FIG. 4 is a schematic representation of symbols mapped onto the grating in FIG. 3.

FIG. 4 illustrates a symbol representation of the grating 104 in FIG. 3. The symbols are indicated by reference numerals 122, 124, 126, 128 and 132. The grating 104 is divided by an internal bit clock time 'T' resulting in 8 symbols, as illustrated.

Figure 5:
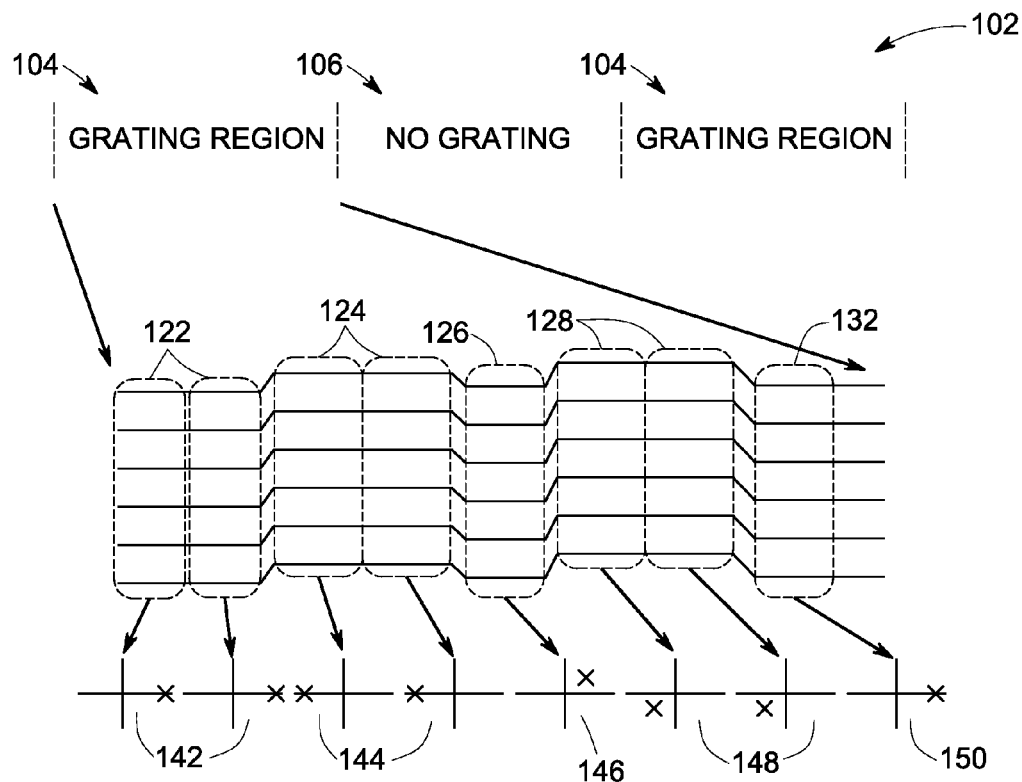
FIG. 5 is a schematic representation of the symbols in FIG. 4 mapped onto respective quadrature representations, in accordance with an embodiment of the invention.

FIG. 5 is a schematic representation of the symbols 122, 124, 126, 128 and 132 (FIG. 4) mapped onto respective quadrature representations 142, 144, 146, 148 and 150. The quadrature representations indicate location of the symbols relative to four quadrants. As illustrated, the symbols 142 are located on an X-axis 162 between a first quadrant 164 and a fourth quadrant 172. Similarly, the symbols 144 are shifted 180 degrees in phase and located on the X-axis 162 between the second quadrant 166 and the third quadrant 168. The symbol 146 is located in the first quadrant 164 shifted in phase at an angle between 0 degree and 45 degrees. Similarly, the symbols 148 are in the third quadrant 168 and the symbol 150 is on the X-axis at a 0 degree phase shift.

Figure 6:
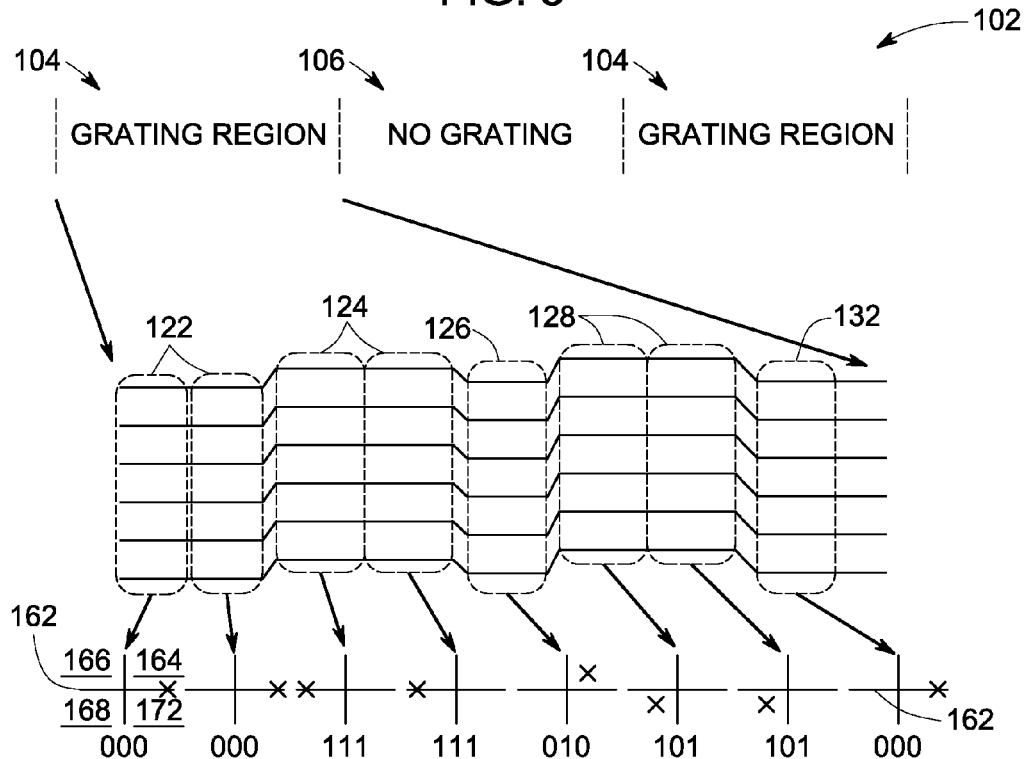
FIG. 6 is a schematic illustration of the quadrature representations mapped onto respective bit representations, in accordance with an embodiment of the invention.

FIG. 6 is a schematic illustration of the quadrature representations 142, 144, 146, 148 and 150 mapped onto respective bit representations 182, 184, 186, 188, and 190. In a particular embodiment, the bit representations are performed via a look-up table. As illustrated herein, the symbols 122 located at a 0 degree phase shift, are represented by '000'. Similarly, the symbols 124 located at a phase shift of 180 degrees are represented by '111'. Furthermore, the symbols 126, 128 and 132 are represented as '010', '101', and '000' respectively. Thus, a single symbol/micro-hologram may be mapped into 3 bits after secondary modulation, allowing increased data storage capability and data transfer rate in the disk.

In a particular embodiment, phase modulation is detected using in-phase and quadrature homodyne detection. Homodyne detection, as well-known to one skilled in the art, uses optical interference between signal and reference beams that results in enhancement or suppression of the detected signal depending on the relative phase difference between the two beams. Interference of the signal beam with two reference beams whose phases are separated by 90° allows one to measure both in-phase and out-of-phase components. When both in-phase and out-of-phase components are detected, they can be used to calculate the phase of the signal beam, which in this example carries the secondary modulation data stream. It should be noted that phase modulation does not change intensity of the reflected beam 18 (FIG. 1) from a sample mark in the optical disk 12 (FIG. 1).

Figure 7:
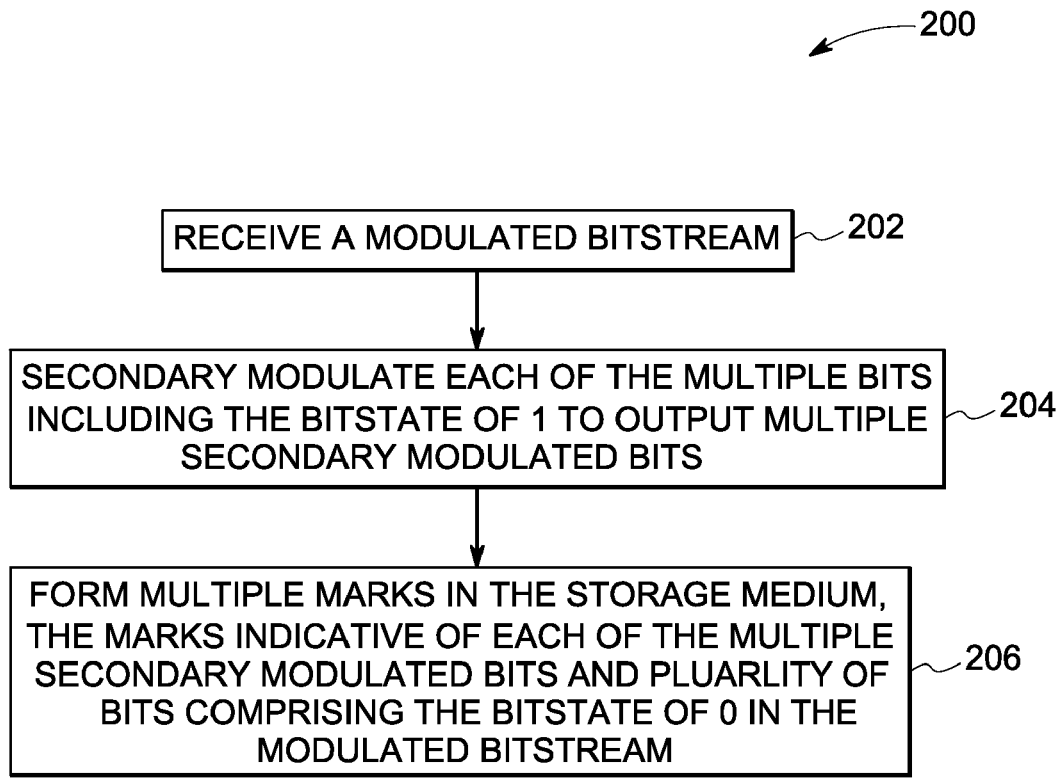
FIG. 7 is a flow chart representing steps in a method for recording data on a storage system in accordance with an embodiment of the invention.

FIG. 7 is a flow chart representing steps in a method 200 for storing data on a storage medium. The method 200 includes receiving a modulated bitstream in step 202, wherein the modulated bitstream comprises a plurality of bits comprising a bitstate of 1 and 0. In a particular embodiment, an optical signal is primary modulated to output the modulated bitstream. In another embodiment, the optical signal is primary modulated via NRZI modulation. Each of the multiple bits including a bitstate of 1 is secondary modulated to output multiple secondary modulated bits in step 204. In one embodiment, the multiple bits including a bitstate of 1 are phase modulated. In an exemplary embodiment, the multiple bits including a bitstate of 1 are phase modulated discretely. In a non-limiting example, the discrete phase modulation represents a lattice code. In another example, the discrete phase modulation employs forward error correction coding. In another embodiment, the multiple bits including a bitstate of 1 are depth modulated. In yet another embodiment, the multiple bits including a bitstate of 1 are amplitude modulated. Multiple marks are formed in the storage medium in step 206, wherein the marks are indicative of each of the multiple secondary modulated bits. Specifically, a single mark is selected from a set of possible marks and the single selected mark is written at a given interval of time. In a particular embodiment, a stepped pattern of micro-reflectors are formed along multiple tracks of a single layer of the storage medium. In another embodiment, a stepped pattern of micro-reflectors are formed across multiple layers of the storage medium.

The various embodiments of a system and method for improved data storage described above thus provide a way to produce a disk with improved features and that can be played using an optical drive designed for an existing format, also referred to as, backward compatibility. The system and method enable cost-effective and efficient manufacturing as the existing manufacturing process may be employed for production of the discs, which include a recording format readable by multiple generations of devices) including additional optional multimedia content. An optical drive with upgraded technology (second generation drive) reproduces the additional content, while an optical drive with non-upgraded technology (first generation drive) reads content excluding the optional multimedia. Subsequently, these techniques provide a cost effective means to a manufacturer, distributor and marketing chain, since a separate accounting, advertising and handling procedures would have been required in case of additional discs been used for accommodating different multimedia content. The techniques and system also enable increased data storage and data rates.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a disc including different resolutions of a movie described with respect to one embodiment can be adapted for use with an amplitude modulated bitstream, as secondary modulation, described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for storing data on a storage medium, the method comprising:
   receiving a modulated bitstream, wherein the modulated bitstream comprises a plurality of bits comprising a bitstate of 1 and 0;
   secondary modulating each of the plurality of bits comprising the bitstate of 1 to output a plurality of secondary modulated bits; and
   forming a plurality of marks in the storage medium, the marks indicative of each of the plurality of secondary modulated bits and the plurality of bits comprising the bitstate of 0 in the modulated bitstream, wherein said forming the plurality of marks comprises forming a stepped pattern of micro-reflectors along multiple tracks of a single layer of the storage medium.

2. The method of claim 1, comprising primary modulating an optical signal to output the modulated bitstream.

3. The method of claim 2, wherein said primary modulating comprises modulating via non-return to zero I (NRZI) modulation.

4. The method of claim 1, wherein said secondary modulating comprises phase modulating the modulated bitstream.

5. The method of claim 4, wherein said phase modulating comprises discretely phase modulating the modulated bitstream.

6. The method of claim 5, wherein said discretely phase modulating comprises employing a lattice code scheme.

7. The method of claim 5, wherein said discretely phase modulating comprises employing forward error correction coding.

8. The method of claim 1, wherein said forming the plurality of marks comprises forming a stepped pattern of micro-reflectors across multiple layers of the storage medium.

9. The method of claim 1, wherein said secondary modulating comprises depth modulating the modulated bitstream.

10. The method of claim 1, wherein said secondary modulating comprises amplitude modulating the modulated bitstream.

11. A method for storing data on a storage medium, the method comprising
   receiving a modulated bitstream, wherein the modulated bitstream comprises a plurality of bits comprising a bitstate of 1 and 0;
   secondary modulating each of the plurality of bits comprising the bitstate of 1 to output a plurality of secondary modulated bits; and
   forming a plurality of marks in the storage medium, the marks indicative of each of the plurality of secondary modulated bits and the plurality of bits comprising the bitstate of 0 in the modulated bitstream, wherein said forming the plurality of marks comprises forming a stepped pattern of micro-reflectors across multiple layers of the storage medium.

12. The method of claim 11, further comprising primary modulating an optical signal to output the modulated bitstream.

13. The method of claim 11, wherein said secondary modulating comprises phase modulating the modulated bitstream.

14. An optical recording system for a storage medium comprising:
   a processor configured to:
       modulate a channel of bits to output a modulated bitstream, wherein the modulated bitstream comprises a plurality of bits comprising a bitstate of 1 and 0; and
       secondary modulate each of the plurality of bits comprising the bitstate of 1 to output a plurality of secondary modulated bits; and
   an optical drive electronics unit electrically coupled to the processor, the optical drive electronics unit configured to:
       receive one or more command signals from the processor; and
       actuate one or more optical components to form a plurality of marks on the storage medium indicative of the plurality of secondary modulated bits, wherein the plurality of marks comprise a plurality of micro-holograms.

15. The optical recording system of claim 14, wherein the secondary modulated bits comprise at least one of a plurality of phase modulated bits, depth modulated bits, amplitude modulated bits or a combination thereof.

16. The optical recording system of claim 14, wherein the storage system comprises a holographic disk.

17. An optical reader for a storage medium comprising:
   an optical drive electronics unit configured to:
       detect a reflected light beam from the storage medium, wherein the storage medium comprises a plurality of bits in a modulated bitstream comprising a bitstate of 0 and a plurality of secondary modulated bits; and
       detect in the reflected light beam either one of:
           plurality of bits comprising the bitstate of 0 in the modulated bitstream; or
           the plurality of bits comprising the bitstate of 0 in the modulated bitstream and the plurality of secondary modulated bits, wherein said optical drive electronics unit comprises a homodyne detector.

18. The optical reader of claim 17, wherein said storage medium comprises a holographic disk.

19. An optical recording system for a storage medium comprising:
   a processor configured to:
       modulate a channel of bits to output a modulated bitstream, wherein the modulated bitstream comprises a plurality of bits comprising a bitstate of 1 and 0; and
       secondary modulate each of the plurality of bits comprising the bitstate of 1 to output a plurality of secondary modulated bits; and
   an optical drive electronics unit electrically coupled to the processor, the optical drive electronics unit configured to:
       receive one or more command signals from the processor; and
       actuate one or more optical components to form a plurality of marks on the storage medium indicative of the plurality of secondary modulated bits, wherein the storage medium comprises a holographic disk.

20. The optical recording system of claim 19, wherein the secondary modulated bits comprise at least one of a plurality of phase modulated bits, depth modulated bits, amplitude modulated bits or a combination thereof.

21. A method for storing data on a storage medium, the method comprising:
   receiving a modulated bitstream, wherein the modulated bitstream comprises a plurality of bits comprising a bitstate of 1 and 0;
   secondary modulating each of the plurality of bits comprising the bitstate of 1 to output a plurality of secondary modulated bits, wherein the secondary modulating comprises phase modulating the modulated bitstream, wherein the phase modulating comprises discretely phase modulating the modulated bitstream, wherein said discretely phase modulating comprises employing a lattice code scheme; and forming a plurality of marks in the storage medium, the marks indicative of each of the plurality of secondary modulated bits and the plurality of bits comprising the bitstate of 0 in the modulated bitstream.

\* \* \* \* \*

UNITED STATES PATENT AND TRADEMARK OFFICE
CERTIFICATE OF CORRECTION

| | | |
|---|---|---|
| PATENT NO. | : 8,050,166 B1 | Page 1 of 1 |
| APPLICATION NO. | : 12/775590 | |
| DATED | : November 1, 2011 | |
| INVENTOR(S) | : Ross et al. | |

It is certified that error appears in the above-identified patent and that said Letters Patent is hereby corrected as shown below:

In Column 9, Line 43, in Claim 11, delete "comprising" and insert -- comprising: --, therefor.

Signed and Sealed this
Sixth Day of March, 2012

David J. Kappos
*Director of the United States Patent and Trademark Office*